US008744603B2

(12) United States Patent
Gao et al.

(10) Patent No.: US 8,744,603 B2
(45) Date of Patent: Jun. 3, 2014

(54) METHOD FOR POSITION FEEDBACK BASED CONTROL FOR OVERLOAD PROTECTION

(75) Inventors: Xiujie Gao, Troy, MI (US); Lei Hao, Troy, MI (US); Paul W. Alexander, Ypsilanti, MI (US); Alan L. Browne, Grosse Pointe, MI (US); Derek L. Patterson, Shelby Township, MI (US); Mark A. Voss, Richmond, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 1024 days.

(21) Appl. No.: 12/814,841

(22) Filed: Jun. 14, 2010

(65) Prior Publication Data

US 2010/0332035 A1 Dec. 30, 2010

Related U.S. Application Data

(60) Provisional application No. 61/221,026, filed on Jun. 26, 2009.

(51) Int. Cl.
G05B 11/01 (2006.01)
G05B 9/02 (2006.01)
G05D 1/10 (2006.01)

(52) U.S. Cl.
USPC .......... 700/13; 700/33; 700/44; 700/78; 700/79; 700/275; 700/302

(58) Field of Classification Search
None
See application file for complete search history.

(56) References Cited

U.S. PATENT DOCUMENTS

| 3,852,770 | A | * | 12/1974 | Jones et al. ............... 347/154 |
| 6,327,249 | B1 | * | 12/2001 | Cookman et al. .......... 370/235 |
| 6,466,893 | B1 | * | 10/2002 | Latwesen et al. .......... 702/179 |
| 7,059,664 | B2 | | 6/2006 | Aase et al. |
| 2005/0198907 | A1 | | 9/2005 | McKnight et al. |
| 2008/0204948 | A1 | * | 8/2008 | Zhang et al. ............... 361/20 |
| 2009/0096672 | A1 | * | 4/2009 | Nagahara ............... 342/357.12 |
| 2010/0099346 | A1 | | 4/2010 | Browne et al. |
| 2010/0112924 | A1 | | 5/2010 | Alexander et al. |

OTHER PUBLICATIONS

U.S. Appl. No. 12/797,911, Hao, Lei.

* cited by examiner

*Primary Examiner* — Sean Shechtman

(57) ABSTRACT

A method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, includes monitoring an overload condition based on position change of the movable element associated with the linear actuator during an integration period and excess energy during the integration period, de-energizing the linear actuator when an overload condition has been detected, monitoring an overload retry counter based on the number of cycles the overload condition is detected, comparing the overload retry counter to an overload retry threshold, an reenergizing the linear actuator when the overload retry counter is less than the overload retry threshold and maintaining de-energizing of the linear actuator when the overload retry counter is at least the overload retry threshold.

20 Claims, 9 Drawing Sheets

METHOD FOR POSITION FEEDBACK BASED CONTROL FOR OVERLOAD PROTECTION

CROSS REFERENCE TO RELATED APPLICATIONS

This application claims the benefit of U.S. Provisional Application No. 61/221,026, filed on Jun. 26, 2009, which is incorporated herein by reference.

TECHNICAL FIELD

This disclosure is related to controlling activation of an active material.

BACKGROUND

The statements in this section merely provide background information related to the present disclosure and may not constitute prior art.

Active materials provide actuation with relatively low cost and mass. Active materials may include shape memory alloys (SMAs), electroactive polymers (EAPs), piezoelectric, magnetostrictive and electrorestrictive materials. By applying a current through the active material to increase the temperature or the magnetic field of the active material, an active material is capable of recovering strain developed from an exerted stress or load. The ability to recover strain enables the active material to provide actuation. In many applications, the active material is an SMA wire or cable. However, due to the thermal characteristics of SMA material, overload protection is essential to prevent the wire from overstretching, and thus, losing the ability to recover strain when activated.

It is known, for example, to use techniques such as mechanical overload protection. Mechanical overload protection requires additional assembly parts that may add to cost, package space restraints and weight.

SUMMARY

A method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, includes monitoring an overload condition based on position change of the movable element associated with the linear actuator during an integration period and excess energy during the integration period, de-energizing the linear actuator when an overload condition has been detected, monitoring an overload retry counter based on the number of cycles the overload condition is detected, comparing the overload retry counter to an overload retry threshold, an reenergizing the linear actuator when the overload retry counter is less than the overload retry threshold and maintaining de-energizing of the linear actuator when the overload retry counter is at least the overload retry threshold.

BRIEF DESCRIPTION OF THE DRAWINGS

One or more embodiments will now be described, by way of example, with reference to the accompanying drawings, in which.

DETAILED DESCRIPTION

Figure 1A:
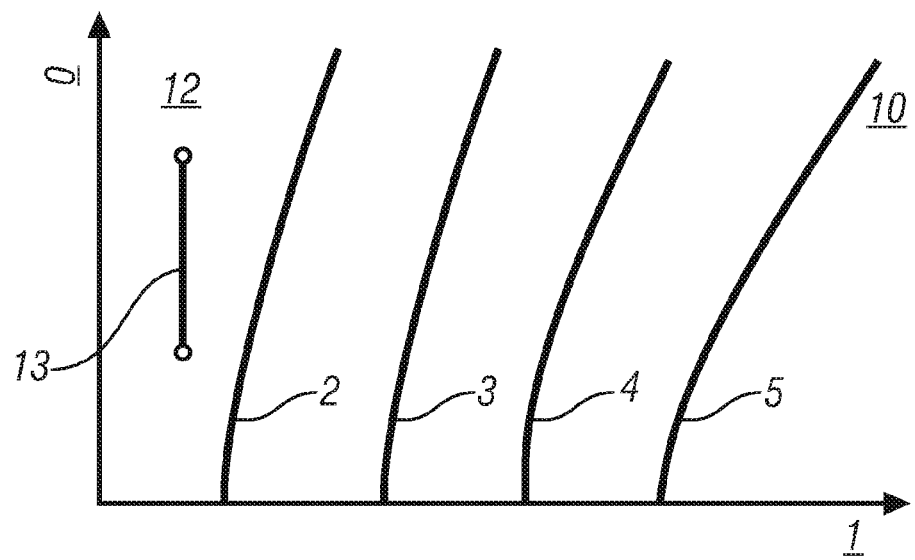
FIGS. 1A and 1B are phase diagrams of critical stresses of austenite-martensite crystal transformations as functions of temperature, in accordance with the present disclosure.
Figure 1B:
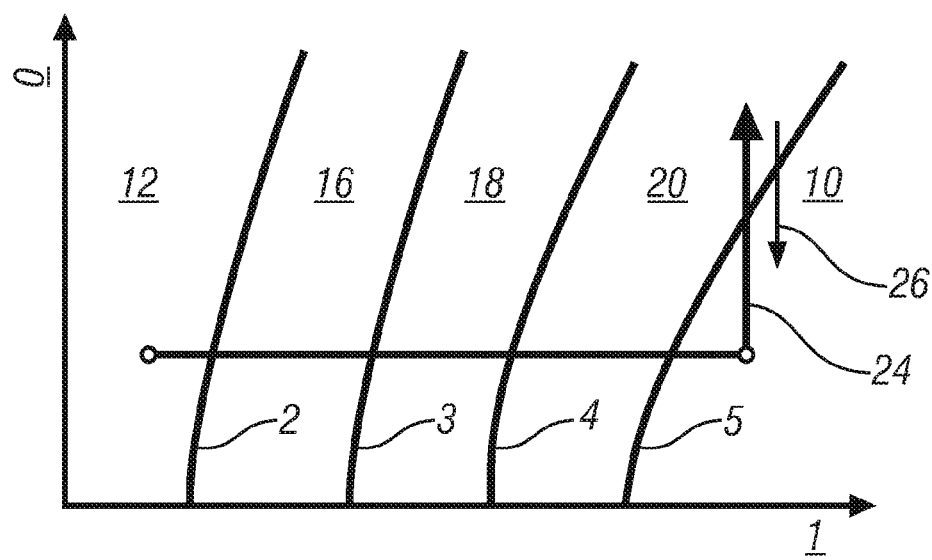

Referring now to the drawings, wherein the showings are for the purpose of illustrating certain exemplary embodiments only and not for the purpose of limiting the same, FIGS. 1A and 1B illustrate a phase diagram of critical stresses for conversion of austenite-martensite crystal transformations as functions of temperature for a shape memory alloy (SMA). The axis of abscissa 1 represents temperature and the axis of ordinate 0 represents stress ($\sigma$). SMAs have the characteristic of very large recoverable strains due to crystallographic transformations between martensite and austenite. As a result, SMAs are desirable because they provide large shape changes or large force generation.

Figure 2:
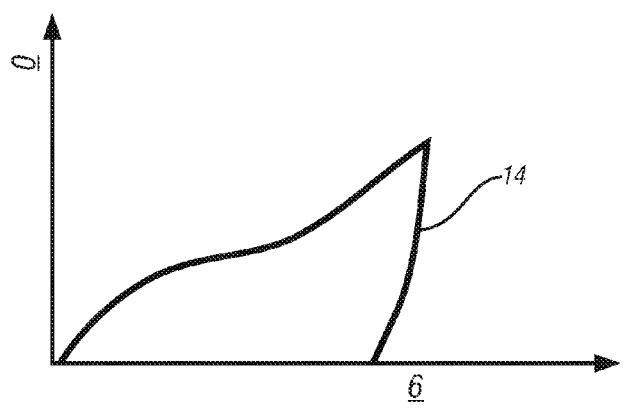
FIG. 2 is a diagram of stress and strain of a material, in accordance with the present disclosure.

FIG. 2 graphically illustrates stress ($\sigma$) and strain ($\epsilon$) of a material. The axis of abscissa 6 represents the strain ($\epsilon$) and the axis of ordinate 0 represents the stress ($\sigma$). As shown, the temperature dependent strain is recovered either in a hysteresis loop upon heating 14 or upon unloading the material. This capability for reversible, controllable large strains is the basis of interest in selecting SMAs as actuator materials. Large shape changes may be induced easily with these materials. In a constrained situation, large stresses may be imparted to the connected structural components.

Referring to FIGS. 1A and 2, SMA behavior is due to a reversible thermoelastic crystalline phase transformation between a high symmetry parent phase, austenite 10, and a low symmetry product phase, martensite 12. The phase changes between austenite 10 and martensite 12 occur as a result of both stress and temperature. Formation of the martensitic phase 12 under stress 13 results in the formation of preferred crystalline variant orientations which leads to a large induced strain.

Referring to FIG. 1B, under a static load and at a sufficiently low temperature, the material is stabilized at martensite 12. At a sufficiently high temperature, the material is stabilized at austenite 10. Martensite start (Ms) 3 and finish (Mf) 2 indicate temperatures where the phase transformation to martensite 12 starts and finishes, respectively. Austenite start (As) 4 and finish (Af) 5 indicate temperatures where the phase transformation to austenite 10 starts and finishes, respectively. At temperatures below Mf 2, an SMA material is stable in the martensite 12 phase. When an SMA material in the martensite 12 phase is heated under constant stress, the transformation to the austenite phase 10 begins only when the temperature exceeds As 4 at a third zone 20. From this point, the material progressively transforms to the austenite phase 10 until the transformation is complete at Af 5. As shown in FIG. 1B, at temperatures above Af 5, the material is stable in the austenite 10 phase at this static stress 22. However, applying a sufficient load 24 to the material may induce a solid-state, diffusionless transformation from austenite 10 to tensile (or detwinned) martensite thereby resulting in an induced strain to the material. During subsequent unloading 26 at the same temperature the material reverts to austenite 10, wherein the strain is wholly or partially recovered.

Figure 3:
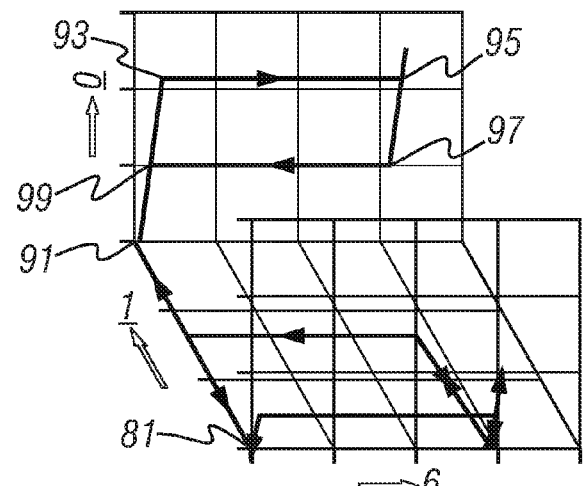
FIGS. 3 and 4 each show a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature, in accordance with the present disclosure.

Referring to FIG. 3, a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature is illustrated. Between reference points 81 and 91, previously induced strain at lower temperature is recovered with an increase in temperature. Between reference points 91 and 93, a tensile load is applied to the SMA cable or wire in its austenite phase, yielding a strain between reference points 91 and 95. While remaining at a constant temperature, the SMA cable or wire is partially unloaded between reference points 95 and 91, wherein a majority of the induced strain is recovered between reference points 97 and 99. While still remaining at the constant temperature, the SMA cable or wire is completely unloaded between reference points 99 and 91, wherein the strain is wholly recovered in the austenite phase. Between reference points 91 and 81, the SMA cable or wire is cooled to a material specific temperature, wherein the material changes phase from the austenite phase to martensite phase. Thus, SMA material may be applied to effect a shape change that is induced in response to an activation signal, e.g., an energizing electric current that causes one of a thermal increase and a thermal decrease in the SMA material. As described herein below, in a physical constraint application, an SMA material may be applied to induce stress between connected structural members in response to the activation signal.

Figure 4:
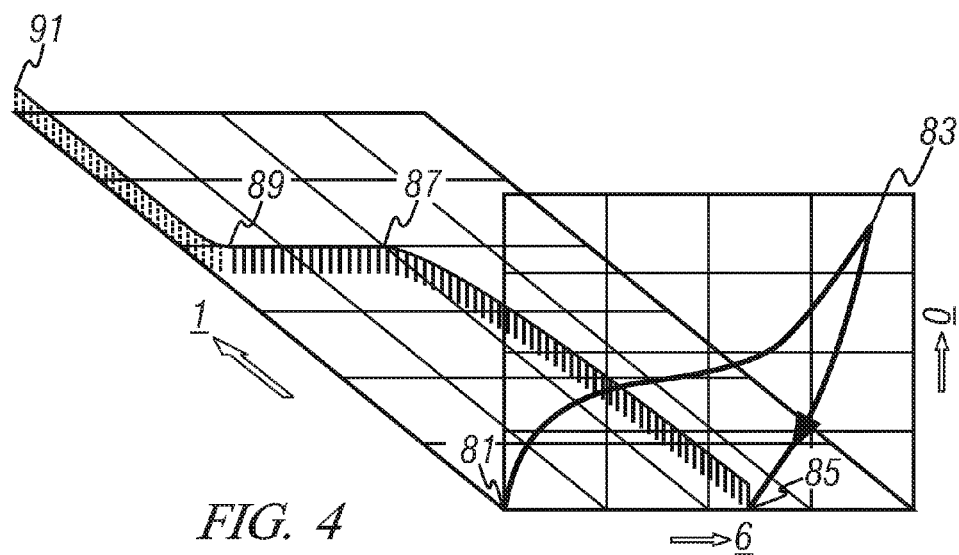

Referring to FIG. 4, a three-dimensional graphical representation indicating stress ($\sigma$) 0, strain ($\epsilon$) 6, and temperature (T(° C.)) 1 for a wire or cable fabricated from an exemplary SMA material that exhibits both shape memory effect and superelastic effect under different conditions of load and temperature is illustrated in accordance with the present disclosure. Between reference points 81 and 83 a load is applied to an SMA material in its martensite phase, yielding a strain. While remaining at a static temperature, the material is unloaded between reference points 83 and 85. The load-unload cycle between reference points 81-85 results in a material stabilized in the martensite phase and having an induced strain. Increasing the temperature of the material results in a relatively static strain between reference points 85 and 87. However, between reference points 87 and 89 the strain decreases (i.e., recovers) rapidly at a material specific temperature, wherein the transformation from martensite to austenite occurs. At reference point 91, the transformed material is stabilized in the austenite phase. Upon cooling from austenite to martensite, little, if any, strain (or shape change) is usually observed, unless, the material has been heavily processed to have a so-called two-way shape memory effect. An alternative to using an SMA material with two-way shape memory effect involves the use of a biasing member to induce strain on the material upon cooling.

Figure 5:
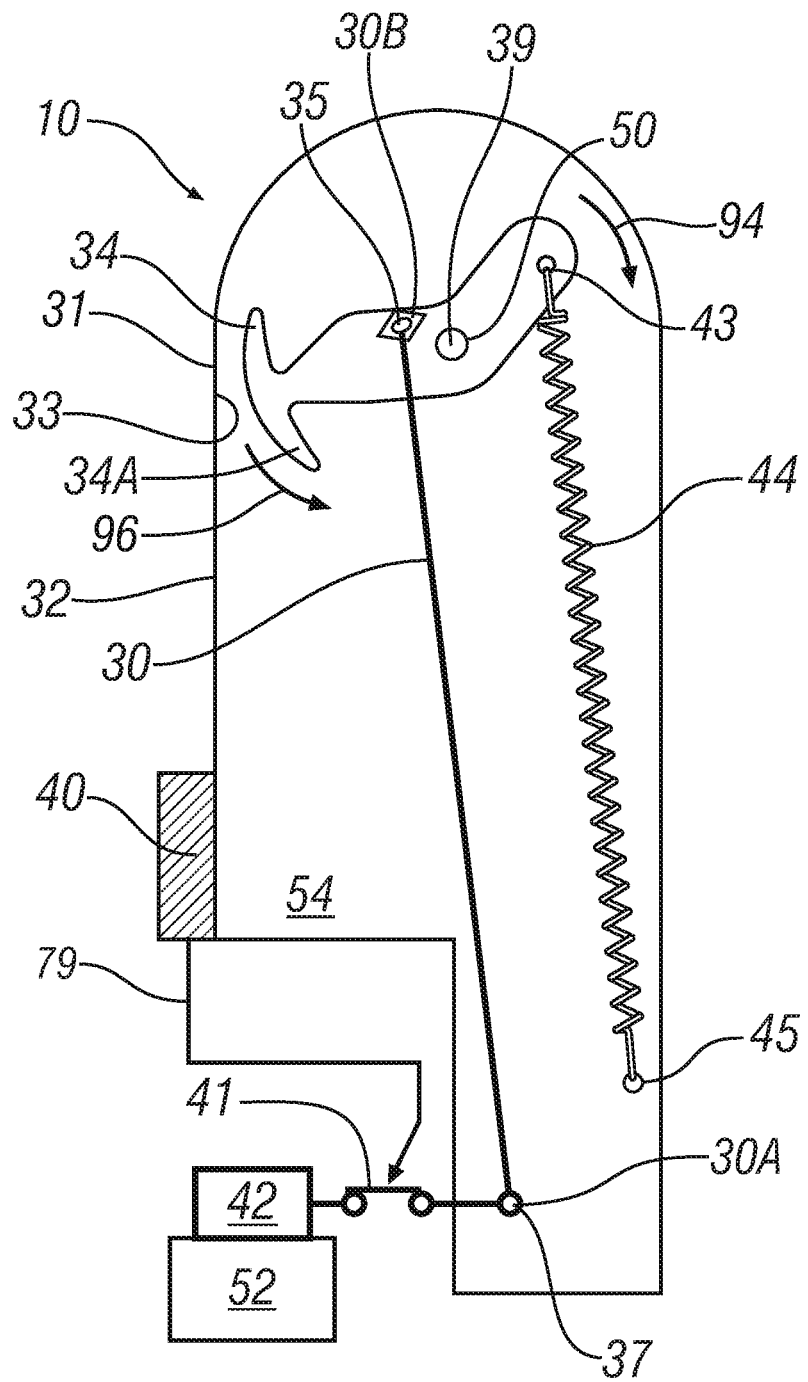
FIG. 5 illustrates an actuator system for a device including a housing with a rotatable element connected to a linear SMA actuator, in accordance with the present disclosure.

FIG. 5 shows an actuator system for a device 10 configured in accordance with an embodiment of the present disclosure. The device 10 includes a housing 32 including a rotatable element 34 pivotably mounted in the housing 32 at an axle 39. The housing 32 includes inner and outer surfaces 31, 33, respectively. The rotatable element 34 may be enclosed within the inner surface 31 of the housing 32. The actuator system includes a linear SMA actuator 30 electrically connected to an activation controller 40. The linear SMA actuator 30 connects to one side of the rotatable element 34, and a mechanical biasing member 44 mechanically couples to the rotatable element 34 on an opposed side relative to the axle 39. The linear SMA actuator 30 and the biasing member 44 apply opposed tensile forces across a pivot point corresponding to the axle 39 resulting in opposed torque arms. A position feedback sensor 50 is configured to monitor the position of the rotatable device 34, e.g., a rotational position. The activation controller 40 monitors a signal input from the position feedback sensor 50 and generates an activation signal $V_{CMD}$) that controls an energizing current to activate the linear SMA actuator 30.

The linear SMA actuator 30 includes a wire or cable fabricated from active material that may include an SMA material. A first end 30A of the linear SMA actuator 30 mechanically couples to a fixed anchor point 37 on the device 10. A second end 30B of the linear SMA actuator 30 mechanically couples to a fixed anchor point 35 on the rotatable device 34. The linear SMA actuator 30 induces a torque on the rotatable device 34 relative to the axle 39 when activated, causing an element 34A of the rotatable device 34 to rotate. Alternative embodiments of active materials include electroactive polymers (EAPs), piezoelectric, magnetostrictive and electrorestrictive materials. It will be appreciated that active material members may be utilized in a wide variety of shapes depending upon the desired function of the device and the activation force required of the member.

The activation controller 40 electrically connects to the linear SMA actuator 30 at the first end 30A and at the second end 30B and generates the activation signal $V_{CMD}$ 79 that controls the energizing current to activate the linear SMA actuator 30. In one embodiment, the energizing current controlled by the activation signal $V_{CMD}$ 79 passes through the linear SMA actuator 30 and causes a temperature change therein to induce strain in the linear SMA actuator 30, causing it to either physically extend or retract the end 30B relative to the first end 30A, thus inducing the torque on the rotatable device 34 to linearly translate the fixed anchor point 35 relative to the fixed anchor point 37 on the device 10. The activation signal $V_{CMD}$ 79 may be used, e.g., to control overall magnitude of electric current associated with the energizing current, or to control an average or RMS magnitude of electric current associated with the energizing current when the electric current is pulse width-modulated or otherwise alternating. It is appreciated that there are other embodiments to provide the activation signal $V_{CMD}$ 79 to control the energizing current.

In one embodiment, the activation controller 40 electrically connects to a switch device 41 to control the energizing current to the linear SMA actuator 30 in response to the activation signal $V_{CMD}$ 79. The switch device 41 controls the energizing current by controlling electric current flow from an energy storage device 42, e.g., a battery, to the first end 30A of the linear SMA actuator 30 at the fixed anchor point 37 via a wiring harness. As depicted, the switch device 41 is in an activated state. The switch device 41 may take any suitable form including a mechanical, electromechanical, power switch device or solid-state device, e.g., IGBT and MOSFET devices.

The biasing member 44 connects to the rotatable device 34 and includes a mechanical spring device in one embodiment with first and second ends 43 and 45, respectively. The first end 43 is mechanically coupled to the rotatable device 34 and the second end 45 is mechanically anchored to the inner surface 31 of the housing 32.

The position feedback sensor 50 is used to monitor a position of the rotatable device 34 from which a present position ($P_M$) associated with the element 34A may be determined. The position feedback sensor 50 may be signally connected to the activation controller 40. The position feedback sensor 50 may be a rotary position sensor attached to the axle 39 and may be configured to measure rotational angle of the rotatable device 34 in one embodiment. In one embodiment, the rotary position sensor 50 may be a potentiometer configured to provide feedback position, and is integrated into the housing 32 of the device 10. Alternatively, other feedback sensors may monitor one of a rotational angle, a linear movement and electric resistance through the linear SMA actuator 30 to obtain the current position. Other sensors providing signal inputs to the activation controller 40 include a voltage monitoring sensor to monitor output voltage ($V_B$) of the energy storage device 42 and a temperature monitoring sensor to monitor ambient temperature ($T_A$) at or near the linear SMA actuator 30.

The rotatable device 34 rotates about the axle 39 when the linear SMA actuator 30 linearly translates the second end 30B relative to the first end 30A in response to the activation signal $V_{CMD}$ 79 from the activation controller 40, changing the position of the element 34A.

In the embodiment shown, the linear SMA actuator 30 linearly translates the rotatable device 34 at the fixed anchor point 35. The linear translation at the fixed anchor point 35 causes the rotatable device 34 to rotate around the axle 39, causing rotation of the element 34A. It will be appreciated that alternative embodiments may involve linear translation of devices connected to the linear SMA actuator 30 and associated rotations and translations.

When the linear SMA actuator 30 is deactivated the biasing member 44 exerts a biasing force 94 on the rotatable device 34, producing a stress imposing a strain on the linear SMA actuator 30 and thereby stretching the linear SMA actuator 30. It should be appreciated that when the linear SMA actuator 30 is deactivated the switch 41 is also deactivated and in an open position. When the linear SMA actuator 30 is activated the linear SMA actuator 30 recovers imposed strain associated with the biasing member, and exerts an opposing force 96 on the biasing member 44, overcoming the biasing force 94 and rotating the rotatable device 34 about the axle 39 and rotating or linearly translating the element 34A. The activation controller 40 is configured to receive a reference signal or a command signal ($P_C$), and generate the activation signal $V_{CMD}$) 79 in response to the reference signal and the feedback signal indicating the present position ($P_M$) associated with the element 34A. The command signal ($P_C$) may include a predetermined discrete position associated with the element 34A, e.g., opened or closed. Alternatively, the command signal ($P_C$) may include a linear position associated with the element 34A, e.g., a percent-opened or percent-closed position. The command signal ($P_C$) may be generated by another control scheme, or may be generated by an operator via a user interface. The command signal ($P_C$) may activate or deactivate the device 10 in response to vehicle conditions. Non-limiting examples of vehicle conditions that generate the command signal ($P_C$) include a door-opening or door-closing event and a hatch opening or hatch closing event.

The activation controller 40 compares a present position feedback signal indicating the present position ($P_M$) associated with the element 34A and the command signal ($P_C$), and generates the activation signal $V_{CMD}$ 79 correspondingly. The activation signal $V_{CMD}$ 79 is used to generate an energizing current across the linear SMA actuator 30 by controlling electric power using pulse width-modulation (PWM) or voltage regulation thereto. The activation controller 40 may include a microcontroller to execute a control scheme and an electric circuit to generate the activation signal $V_{CMD}$ 79 that is communicated to a power stage, e.g., a PWM controller to enable and disable the energizing current flowing through the linear SMA actuator 30. A time-based derivative of the present position feedback signal indicating the present position ($P_M$) may be used for overload protection and precise control.

Figure 6:
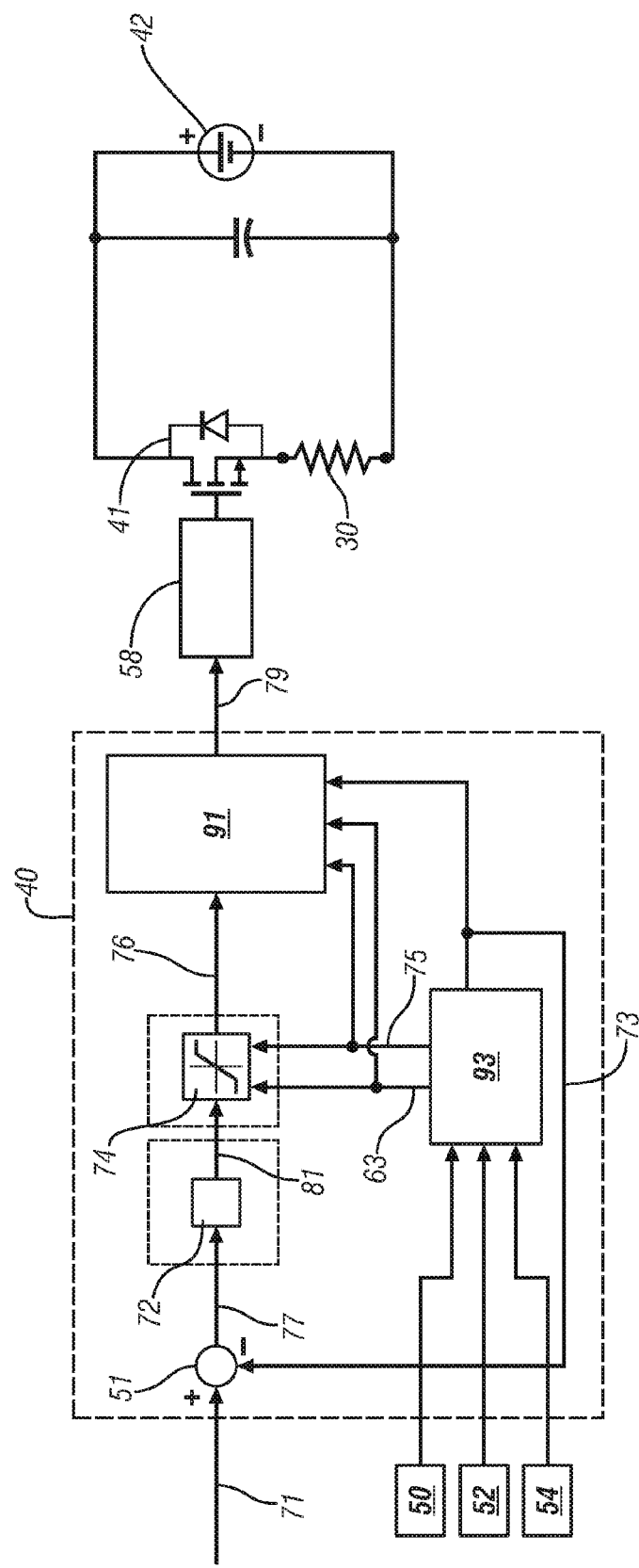
FIGS. 6 and 7 each illustrate a detailed schematic diagram of a control circuit including an activation controller to control position of a device using a linear SMA actuator, in accordance with the present disclosure.

FIG. 6 shows a detailed schematic diagram of an embodiment of a control circuit for the activation controller 40 to control position of a device, e.g., to control position of element 34A of the rotatable device 34. The activation controller 40 includes a control circuit to generate the activation signal $V_{CMD}$ 79 to control a PWM generator 58 that controls the energizing current to the linear SMA actuator 30 via switch device 41. Alternatively, the activation controller 40 includes a control circuit to generate the activation signal $V_{CMD}$ 79 that includes a voltage regulator or a current regulator device that controls the energizing current to the linear SMA actuator 30.

A command signal 71 is generated, which may be a command signal ($P_C$) 76 associated with a preferred position of a device, e.g., a preferred position of element 34A of rotatable device 34. The position feedback sensor 50 measures the present position feedback signal 73 which is input to a signal processing circuit 93, from which a present position ($P_M$) of an element of interest, e.g., position of element 34A of rotatable device 34 is determined. The signal processing circuit 93 also monitors signal inputs from a supply voltage sensor 52 and an ambient temperature sensor 54 to determine voltage potential ($V_B$) 63 and ambient temperature (T) 75, respectively.

The present position ($P_M$) and the preferred position ($P_C$) (i.e., the present position feedback signal 73 and the command signal 71, respecitvely) are compared using a difference unit 51 that determines a position difference or error signal 77 that is input to an error amplifier 72. The error amplifier 72 may include a PI controller, and generates an amplified signal 81 that is communicated to a signal limiter 74. The signal limiter 74 imposes limits on the amplified signal 81 to generate the control signal 76, the control signal 76 including maximum and minimum control signal values associated with the voltage potential ($V_B$) 63 and the ambient temperature (T) 75. An overload protection scheme 91 monitors the control signal 76 in context of the voltage potential ($V_B$) 63 output from the energy storage device 42, the ambient temperature (T) 75, and the present position feedback signal 73 indicating the present position ($P_M$) of element 34A of rotatable device 34 to detect an mechanical overload condition and execute overload protection to prevent commanding a control signal that may mechanically overload the linear SMA actuator 30. A final control signal, i.e., the activation signal $V_{CMD}$ 79 includes a duty cycle control signal for controlling the linear SMA actuator 30 that is output to an actuator, e.g., one of the PWM generator 58 and associated switch device 41. Alternatively, the activation signal $V_{CMD}$ 79 including the voltage control signal for controlling the linear SMA actuator 30 may be output to a voltage regulator or a current regulator. An exemplary overload protection scheme is described with reference to FIG. 14.

Figure 7:
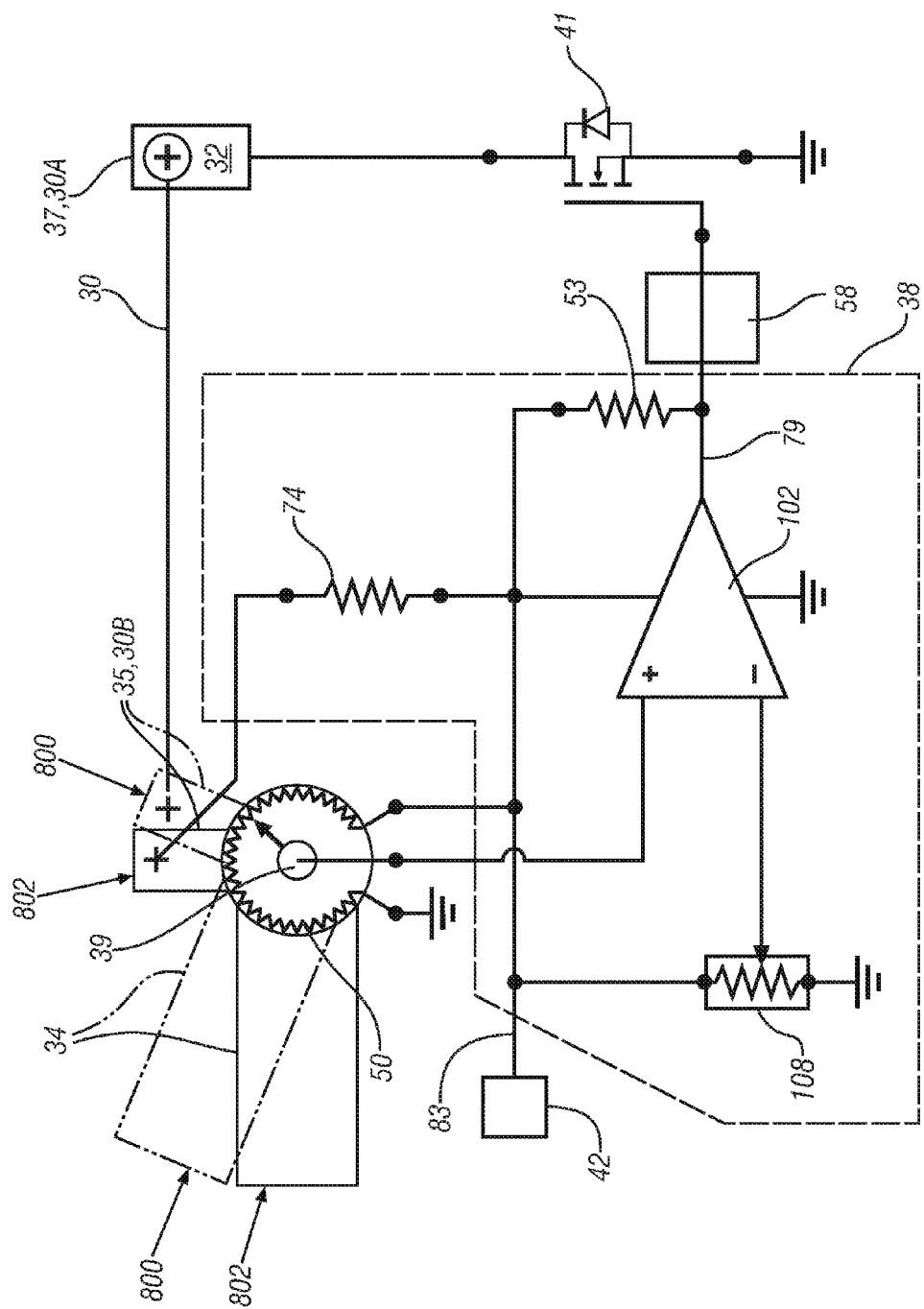

FIG. 7 is a schematic diagram showing details of an embodiment of a control circuit 38 used by the activation controller 40 to control the energizing current transferred to the linear SMA actuator 30, including the position sensor 50. The position sensor 50 may be a potentiometer device configured to operate as a rotary position sensing device as depicted. The control circuit 38 includes a linear comparator device 102, which may be an operational amplifier in one embodiment. The energy storage device 42 supplies an output voltage ($V_C$) 83 to provide electric power to the position sensor 50 and the linear comparator device 102. The controllable output voltage ($V_C$) 83 may be 0 V DC, which deactivates the control circuit 38 to control the linear SMA actuator 30 in an extended state 800 with corresponding rotation of the rotatable element 34. The controllable output voltage ($V_C$) 83 may be 5 V DC or another suitable voltage level to activate the control circuit 38 to control the linear SMA actuator 30 in a retracted state 802 with corresponding rotation of the rotatable element 34.

When the energy storage device 42 controls the output voltage ($V_C$) 83 to activate the control circuit 38, electric power is provided to the linear SMA actuator 30, causing it to retract. The position sensor 50 generates a signal input to the positive (+) input of the linear comparator device 102. A signal input to the negative (−) input of the linear comparator device 102 is a calibratable reference voltage that may be set using a variable resistor device 108 that forms a voltage divider. It is appreciated that the reference voltage input to the negative (−) input of the linear comparator device 102 may be generated using other devices and methods. The reference voltage to the negative (−) input of the linear comparator device 102 controls the linear SMA actuator 30 to a predetermined length associated with the retracted state 802 and correspondingly rotates the rotatable element 34 when the control circuit 38 is activated by providing electric power via the energy storage device 42. The comparator 102 generates an output voltage that corresponds to the activation signal $V_{CMD}$ 79 that may be input to an optional circuit driver 58 in one embodiment. The voltage limiter 74, which is in the form of a resistor device in one embodiment, is electrically connected between the second end 30B of the linear SMA actuator 30 and the energy storage device 42. There is a pull-up resistor 53 electrically connected between the energy storage device 42 and the output pin of the comparator 102.

The linear SMA actuator 30 includes first and second ends 30A and 30B, respectively wherein the second end 30B is mechanically coupled to the fixed anchor point 35 on the rotatable device 34 and the first end 30A is mechanically anchored to the fixed anchor point 37 on an inner surface of housing 32. The feedback voltage from the position sensor 50 is input to comparator 102, wherein the feedback voltage is compared to the reference voltage. The comparator device 102 signally connects to the optional circuit driver 58 and generates the activation signal to control switch device 41 to control electric power to the linear SMA actuator 30 responsive to the activation signal $V_{CMD}$. The comparator 102 is configured to control the energizing current and associated material temperature and therefore the length of the linear SMA actuator 30. Because the feedback voltage from the position sensor 50 is used to control the length of the linear SMA actuator 30, any outside forces such as temperature or air currents are internally compensated. In operation, so long as the feedback voltage from the position sensor 50 is less than the reference voltage, the activation signal $V_{CMD}$ 79 controls the switch device 41 to transfer the energizing current across the linear SMA actuator 30. When the feedback voltage from the position sensor 50 is greater than the reference voltage, the activation signal $V_{CMD}$ 79 output from the comparator 102 drops to zero, serving to deactivate the switch device 41 to interrupt and discontinue the energizing current across the linear SMA actuator 30. The rotatable element 34 is shown in the first position 800 associated with the deactivated state and the second position 802 associated with the activated state, which correspond to the reference voltage of the voltage divider 108 at 0 V DC and 5 V DC, respectively, in one embodiment.

Figure 8A:
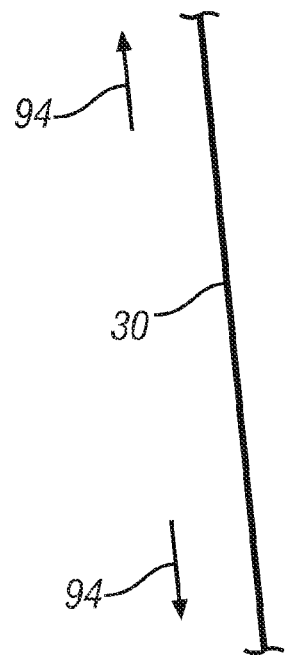
FIGS. 8A and 8B illustrate detailed views of stress ($\sigma$), strain ($\epsilon$) and strain recovery ($\epsilon_{REC}$) on an SMA actuator when the SMA actuator is activated and deactivated, in accordance with an exemplary embodiment of the present disclosure.
Figure 8B:
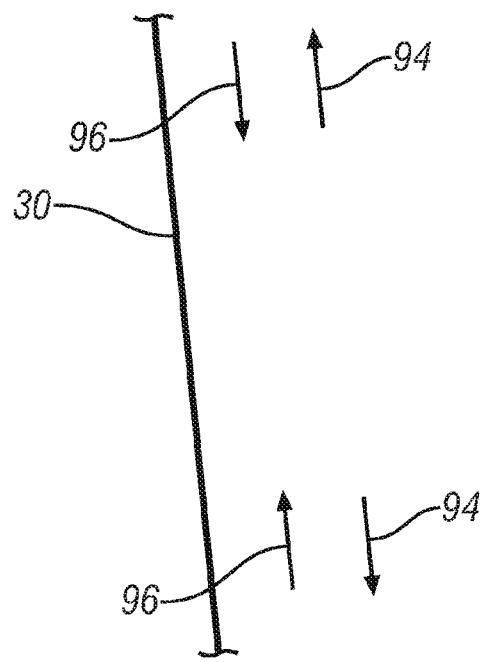

In accordance with an exemplary embodiment of the present disclosure, FIGS. 8A and 8B illustrate detailed views of stress ($\sigma$), strain ($\epsilon$) and strain recovery ($\epsilon_{REC}$) on the SMA actuator 30 when the SMA actuator 30 is activated and deactivated. It will be appreciated that FIG. 8A corresponds to the SMA actuator 30 being deactivated, i.e., in the extended state 800. FIG. 8B corresponds to the SMA actuator 30 being activated, i.e., in the retracted state 802. It should be appreciated that the SMA actuator 30 may include an SMA material chosen such that the ambient or operating temperature of the SMA actuator 30 is less than the austenite start temperature of the SMA material. Hence, when the SMA actuator 30 is deactivated, and not electrically heated, the SMA actuator 30 remains in the martensite phase and is protected against accidental actuation due to a rise in the ambient temperature.

Referring to FIG. 8A, when the linear SMA actuator 30 is deactivated the biasing member 44 exerts a biasing force 94 on the rotatable device 34, producing a stress ($\sigma$) imposing a strain ($\epsilon$) on the linear SMA actuator 30 and thereby stretching the linear SMA actuator 30 to the extended state 800. It should be appreciated that when the linear SMA actuator 30 is deactivated, the switch 41 is also deactivated and in an open position. It is further appreciated that the position feedback sensor 50 measures the present position feedback signal which is input to the signal processing circuit 93, from which the present position ($P_M$) 73 of element 34A of rotatable device 34 is determined.

Referring to FIG. 8B, when the SMA actuator 30 is activated, the SMA actuator recovers imposed strain ($\epsilon_{REC}$) associated with the biasing member, and exerts the opposing force 96 on the biasing member 44, overcoming the biasing force 94 and rotating the rotatable device 34 about the axle 39 and rotating or linearly translating the element 34A. It should be appreciated that the position feedback sensor 50 measures the present position feedback signal which is input to the signal processing circuit 93, from which the present position ($P_M$) 73 of element 34A of rotatable device 34 is determined.

Embodiments envisioned include executing an overload protection scheme when an overload condition is detected. It is understood that detecting overload conditions may be based on predefined windows where detection of an overload condition must be met for a specified number of times within a window. Likewise, a moving window may be used to count the number of samples in a window that meets the overload condition criteria and the count may be updated according to the previous window and the current window. Alternatively, overload conditions may be detected in a time-based manner without utilizing predefined windows.

As aforementioned, with reference to FIG. 6, the overload protection scheme 91 monitors the control signal 76 in context of the voltage potential ($V_B$) 63 output from the energy storage device 42, the ambient temperature (T) 75, and the present position feedback signal 73 indicating the present position ($P_M$) of element 34A of rotatable device 34 to detect a mechanical overload condition and execute overload protection to prevent commanding a control signal that may mechanically overload the linear SMA actuator 30. Specifically, the activation signal $V_{CMD}$ 79 controls the switch device 41 to transfer the energizing current across the linear SMA actuator 30 to activate the linear SMA actuator 30, from which the present position ($P_M$) 73 of element 34A of rotatable device 34 is changed to the preferred position. For instance, the present position ($P_M$) 73 of element 34A of rotatable device 34 may be changed to the preferred position in order to assist an opening or closing event for a door or hatch of a vehicle. Therefore, a position change is required to move the element 34A of rotatable device 34 from an initial present position ($P_M$) 73 (i.e., closed hatch) to the preferred position ($P_C$) (i.e., open hatch). It is understood that the position change is variable and will decrease with time during periods of activation because the present position will be moving closer to the preferred position when activated.

Executing mechanical overload protection of the linear SMA actuator 30 to prevent commanding an activation signal $V_{CMD}$ 79 to the linear SMA actuator 30 that may mechanically overload the linear SMA actuator 30 when an overload condition is detected first includes monitoring the occurrence of an overload condition. An overload condition may be detected based on position change (i.e., error signal 77) of element 34A of rotatable device 34 during an integration period and integration of excess energy or accumulated energy during the integration period. It will become apparent that if the integration period lapses prior to detecting an overload condition, the integration period is reset and the integration of excess energy is restarted wherein the position change (i.e., error signal 77) will be decreased due to continued activation of the linear SMA actuator 30. Likewise, an overload condition may also be detected based on the error signal 77 and integration of excess energy without monitoring an integration period. It is appreciated that the integration period corresponds to predefined windows where detection of an overload condition must be met for a specified number of times within a window. Further the integration of excess energy may include monitoring the output voltage ($V_C$) 83 of the energy storage device 42, monitoring a control signal difference between the control signal 76 and a control signal threshold and integrating the product between the control signal difference and the output voltage ($V_C$) 83 to determine the excess energy. To achieve a consistent performance, both the control signal 76 and the control signal threshold may be varied according to the ambient temperature substantially at the linear SMA actuator 30 and the voltage applied to the linear SMA actuator 30. As aforementioned, the control signal 76 may correlate to the final control signal (i.e., the activation signal 79) for controlling energizing current across the linear SMA actuator 30 utilizing pulse-width modulation duty cycles, or alternatively, voltage regulation or current regulation. As will become apparent, the control signal 76 and the control signal threshold may be variably selected based on previous activation cycles to compensate for residual heat retention across the linear SMA actuator 30. Specifically, the control signal 76 may be decreased to compensate for increased residual heat retention across the linear SMA actuator 30 during a preceding activation cycle.

Figure 9:
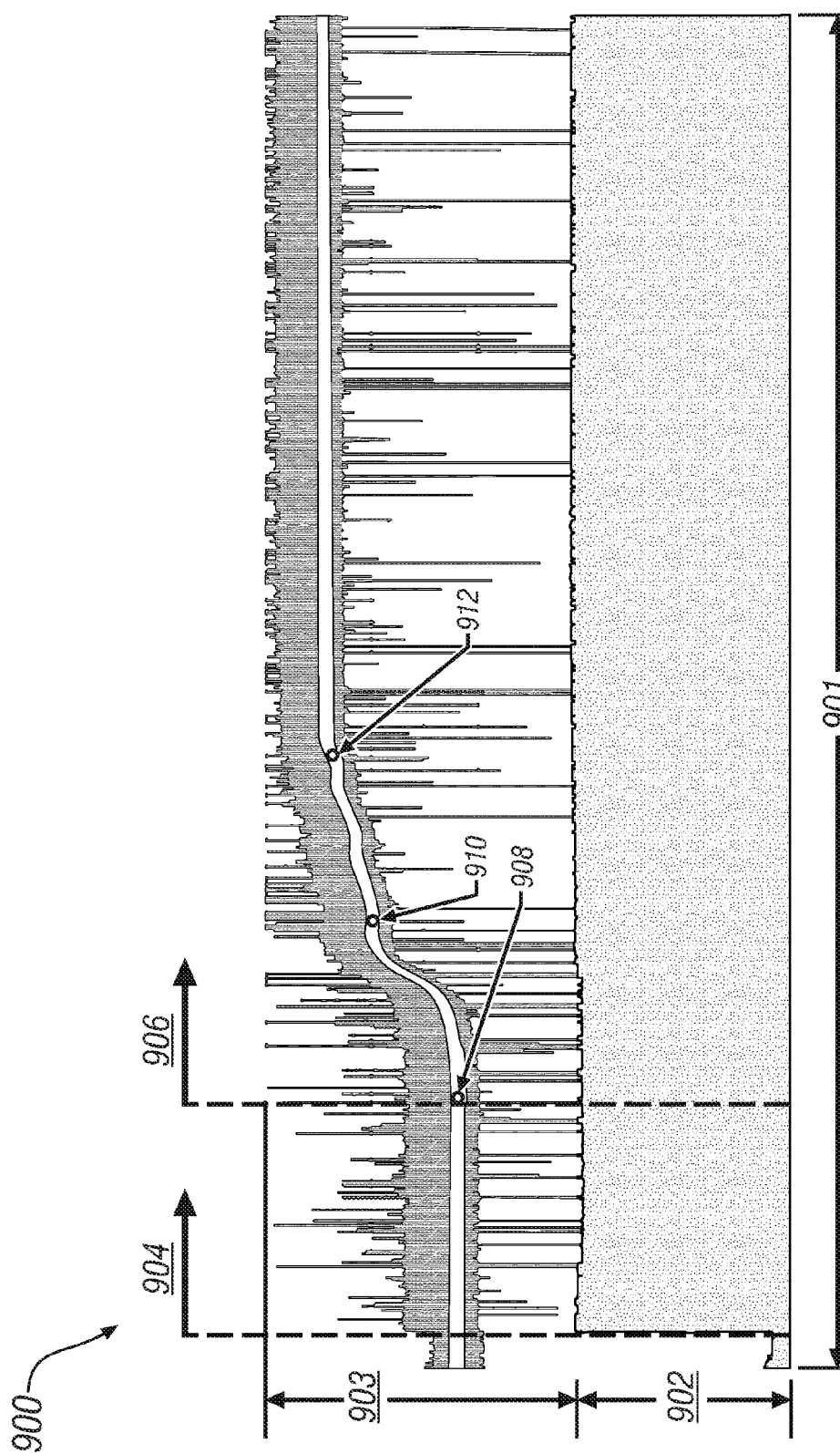
FIG. 9 illustrates exemplary test data depicting a plot 900 of position change of the linear SMA actuator 30 and corresponding pulse-width modulation (PWM) duty cycle versus time, in accordance with the present disclosure.

Referring to FIG. 9, exemplary test data depicting a plot 900 of position change of the linear SMA actuator 30 and corresponding pulse-width modulation (PWM) duty cycle versus time. The axis of abscissa represents time 901 in seconds and the axis of ordinate represents the PWM duty cycle 902 and the position 903 of the linear SMA actuator 30. Denoted by vertical dashed line 904, activation of the linear SMA actuator is controlled by the PWM duty cycle 902 to apply an energizing current across the linear SMA actuator 30. An initial delay period is located between vertical dashed line 904 and vertical dashed line 906. The initial delay period is variably selected to compensate for residual heat retention within the linear SMA actuator 30, ambient temperature variation substantially at the linear SMA actuator 30 and voltage variation applied to the linear SMA actuator 30. During an activation cycle the linear SMA actuator 30 is heated up from ambient temperature for a period of time to move the element 34A of rotatable device 34 to the preferred position, and then cooled down to ambient temperature after power is removed. For instance, it may take 10 seconds to cool the actuator down to ambient temperature. If the linear SMA actuator 30 is not fully cooled prior to a subsequent activation cycle, residual heat retained across the actuator will reduce the time taking to heat the linear SMA actuator 30 from the present position to the preferred position. As a result, the initial delay period needs to be decreased according to increased residual heat retention from the preceding activation cycle. Likewise, the initial delay period needs to be decreased according to increased ambient temperature substantially at the linear SMA actuator 30 and/or voltage applied to the linear SMA actuator 30. As denoted by vertical dashed line 906, integration of excess or accumulated energy begins. Here, output voltage of an energy storage device (i.e., output voltage ($V_C$) 83 of the energy storage device 42 shown in FIG. 7) and the difference between the PWM duty cycle 902 and a PWM duty cycle threshold are monitored. The product between the output voltage and the difference between the PWM duty cycle 902 and the PWM duty cycle threshold are integrated over an integration period. For example, the integration may be four seconds. As aforementioned, the integration period correlates to predefined windows where detection of an overload condition must be met for a specified number of times within a window. Coincidentally with the integration of excess energy, the position change is continuously monitored. As illustrated, point 908 may represent an initial position of the linear SMA actuator 30. For example, the initial position may correspond to a closed position of a vent. Point 912 may represent the preferred position of the linear SMA actuator 30. For example, the preferred position may correspond to an open position of the vent. The position change during the integration period may be the difference between points 912 and 908. Likewise, as the integration period increases, the position change may decrease. For instance, point 910 may be a new present position, wherein the decreased position change is the difference between points 910 and 912. Subsequent to monitoring the integration of excess energy and the position change, the integration of excess energy is compared to an integration threshold and the position change is compared to a position change threshold. An overload condition is detected when the integration of excess energy during the integration period exceeds the integration threshold and the position change during the integration period is less than the position change threshold. Likewise, an overload condition is not detected when one of the integration of excess energy during the integration period does not exceed the integration threshold and the position change during the integration period is at least the position change threshold. Hence, if the overload condition is not detected within the integration period, the integration period is reset and integration and position change are re-monitored.

Figure 10:
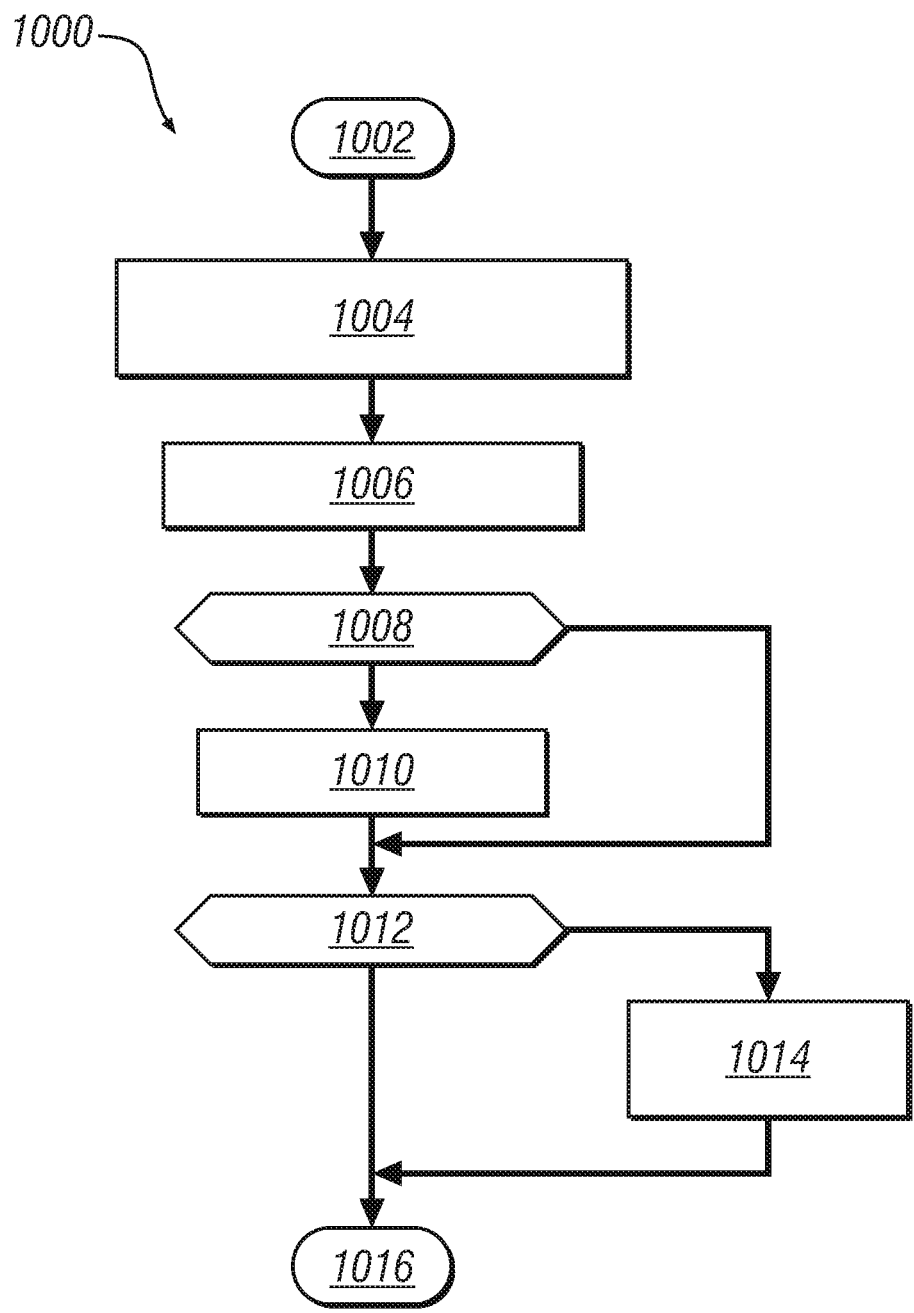
FIG. 10 graphically illustrates a control scheme 1000 depicting a method for monitoring an overload condition based on an error signal 77 and integration of excess energy without monitoring an integration period, in accordance with the present disclosure.

Referring now to FIGS. 6 and 10, a control scheme 1000 is illustrated depicting a method for monitoring an overload condition based on the error signal 77 and integration of excess energy without monitoring an integration period. The control scheme 1000 begins at block 1002 and proceeds to block 1004 where the integration of excess or accumulated energy is monitored. The integration of excess energy is determined based on output voltage of an energy storage device (i.e., output voltage ($V_C$) 63 of the energy storage device 42 shown in FIG. 6) and the difference between the control signal 76 and a control signal threshold are monitored. It is appreciated that the control signal threshold may be based upon the energizing current required to move element 34A of rotatable device 34 to the preferred position according to time. The product between the output voltage and the difference between the control signal 76 and the control signal threshold are integrated to determine the integration of excess energy before proceeding to block 1006. At block 1006, the error signal 77 is monitored based on the command signal 71 and the present position feedback signal 73. As aforementioned, the command signal 71 indicates the preferred position of element 34A of rotatable device 34 and the present position feedback signal 73 indicates the present position of element 34A of rotatable device 34. At block 1008, the error signal 77 is compared to an error threshold. If the error signal 77 is less than the error threshold, the control scheme 1000 proceeds to block 1010 where the integration determined at block 1004 is set to zero before proceeding to block 1012. If the error signal at block 1006 is at least the error threshold, the control scheme 1000 proceeds to block 1012 where the integration of excess energy is compared to an integration threshold. If the integration of excess energy is greater than the integration threshold an overload condition is detected. If the integration of excess energy is less than or equal to the integration threshold an overload condition is not detected and the control scheme 1000 ends at block 1016. It is appreciated that any time the error signal 77 is less than the error threshold, the integration of excess energy will also be less than the integration threshold because the integration of excess energy is set to zero in block 1010 if the error signal 77 is less than the error threshold. Therefore, an overload condition is detected when the error signal 77 is at least the error threshold and the excess energy is at least the excess energy threshold and an overload condition is not detected when one of the error signal 77 is less than the error threshold and the excess energy is less than the excess energy threshold. It is further understood, that if the error signal 77 is less than the error threshold, element 34A of rotatable device 34 may have achieved the preferred position, therefore, activation has been successfully completed.

Figure 11:
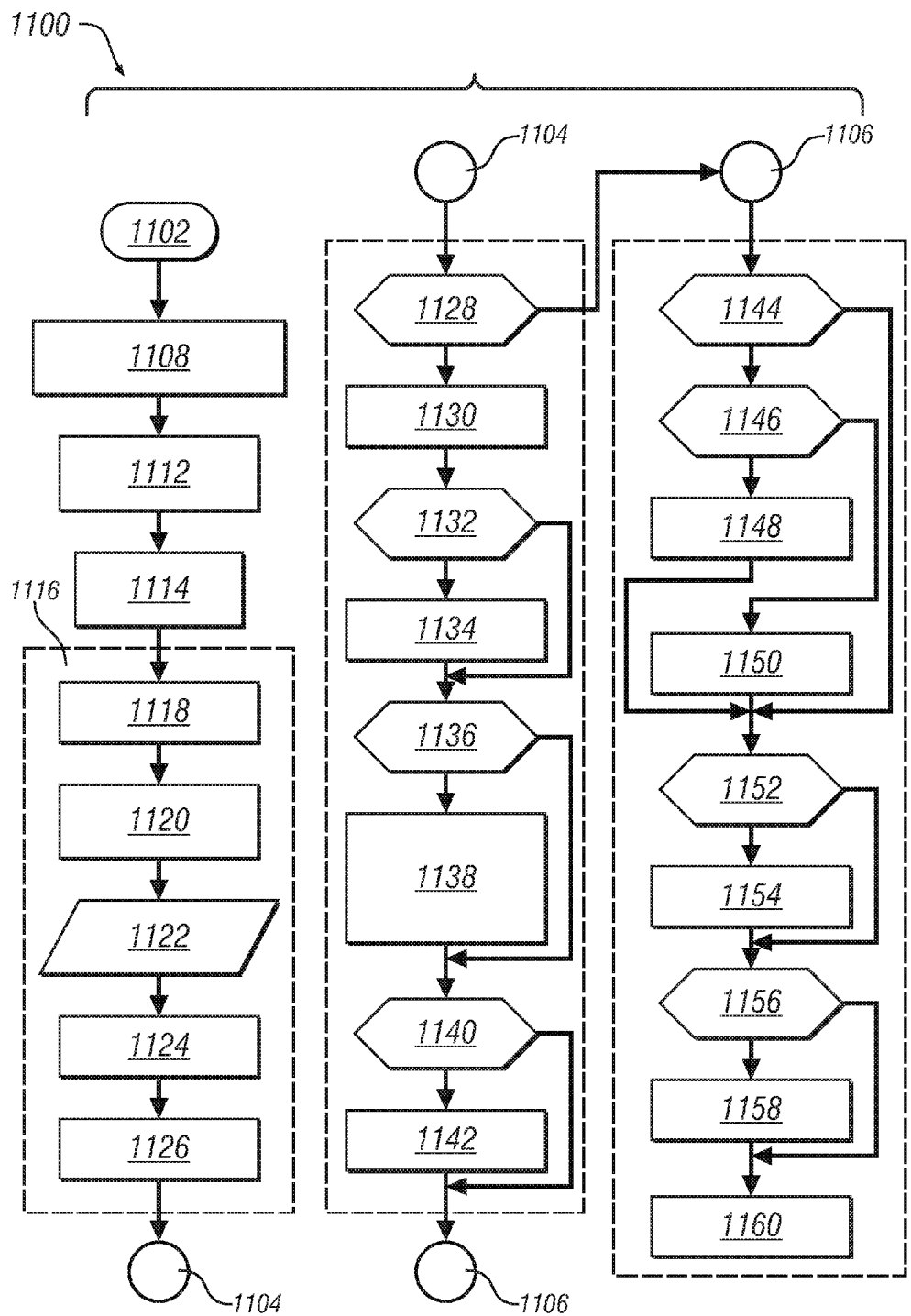
FIG. 11 illustrates a mechanical overload protection control scheme to prevent commanding a control signal to a linear actuator that may mechanically overload the linear actuator when an overload condition of the linear actuator is detected.

Referring now to FIGS. 6 and 11, an exemplary overload protection scheme 1100 is illustrated in accordance with the present disclosure. The scheme 1100 begins at block 1102 and variables and thresholds utilized in the scheme 1100 are defined at block 1108. At block 1112 the delay is defined to allow for initialization. In a non-limiting example, the delay period is set for 2.5 seconds. At block 1114, initialization of the scheme 1100 is performed including, as an example, monitoring an initial position of element 34A of rotatable device 34. The initial position is monitored multiple times and averaged. The initial position may include, for example, a closed position of a hatch vent. It will be appreciated that the steps performed in blocks 1102-1114 are performed once and are not included as the loop disclosed herein at blocks 1118-1160.

At block 1118, a loop counter is incremented. For example, the loop counter may be selected to monitor each of blocks 1118-1160 every four milliseconds. At block 1120, present position $P_M$ 73 of element 34A of rotatable device 34, ambient temperature (T) 75 substantially at or near the linear SMA actuator 30 and the voltage potential ($V_B$) 63 output from the energy storage device 42 are monitored to determine the control signal 76 at block 1122 (i.e., PWM duty cycle, voltage or current control signals). Block 1122 determines how much energizing current will be applied across the linear SMA actuator 30. At block 1124, the position change (i.e., error signal 77) is calculated based on the command signal 71 and the present feedback signal 73 (i.e., the preferred position ($P_C$) and the present position ($P_M$), respectively). At block 1126, activation begins and a corresponding activation counter is initiated based on the activation signal ($V_{CMD}$ 76) before proceeding to column 1104.

At decision block 1128, the activation counter is compared to an initial delay period. As aforementioned, the initial delay period is variably selected to compensate for residual heat retention within the linear SMA actuator 30 from prior activation cycles. The initial delay period may be selected from a look up table (LUT) or equation based upon elapsed time from a previous activation cycle corresponding to residual heat retention. If the activation counter is not greater than the initial delay period, the scheme proceeds to decision block 1144 in column 1106, where it is determined that an overload condition is not detected. If the activation counter is greater than the initial delay period, the scheme proceeds to block 1130. It is appreciated that the initial delay period may substantially eliminate false detection of overload conditions while the linear SMA actuator 30 is warming up from the energizing current applied across the linear SMA actuator 30 or variations in ambient temperature substantially at the linear SMA actuator 30. At block 1130, excess energy is integrated. At block 1132, position change is compared to a position change threshold and an integration period monitored. If one of the position change is greater than the position change threshold and the integration period is reached, integration is reset at block 1134. In other words if the position change is greater than the position change threshold or the integration period is reached, integration is reset at block 1134. If position change is not greater than the position change threshold, or the integration period has not elapsed, the scheme proceeds to decision block 1136 where the integration of excess energy is compared to an integration threshold. As aforementioned, the position change decreases with time during periods of activation. If the integration of excess energy is greater than the integration threshold, an overload condition is detected and the scheme 1100 proceeds to block 1138. If the integration of excess energy is not greater than the integration threshold an overload condition is not detected. It should be appreciated that blocks 1128-1136 correspond to the integration method disclosed in FIG. 9 utilizing predefined windows where detection of an overload condition must be met for a specified number of times within a window (i.e., the integration period). If the integration of excess energy at block 1140 is negative, indicating the present feedback signal 73 exceeded the command signal 71, integration is reset at block 1142.

Overload protection is implemented when an overload condition has been detected at block 1138, wherein the linear SMA actuator 30 is immediately deactivated and de-energized. At block 1138, the present position of element 34A of rotatable device 34 where the overload condition is detected is flagged, an overload close counter is monitored and a retry counter corresponding to the number of activation cycles having flags indicating the overload position of element 34A of rotatable device 34 at which the overload condition is detected is monitored. Embodiments envisioned include monitoring the number of successive activation cycles having flags corresponding to the overload position, comparing the number of successive activation cycles having flags corresponding to the overload position to a target threshold and resetting the preferred position of element 34A of rotatable device 34 to the overload position when the target threshold is reached. It is appreciated that the flag is stored within the activation controller 40, wherein the number of cycles, last overload positions and last operating time of a pervious activation cycle are stored in memory within the activation controller 40. At decision block 1144, it is determined an overload condition exists as indicated by the flag indicating the overload position before proceeding to decision block 1146. As previously mentioned, decision block 1144 does not indicate an overload condition when the integration of excess energy at decision block 1136 is not greater than the integration threshold or the initial delay at decision block 1128 has not been exceeded. As such, if an overload condition has not been detected at decision block 1144 (i.e., no flag), the scheme proceeds to decision block 1152.

Referring to decision block 1146, when it is determined that an overload condition has been detected at decision block 1144 (i.e., flagged), the overload close counter is compared to an overload close threshold. If the overload close counter is greater than the overload close threshold, the scheme 1100 proceeds to block 1150 where it is presumed that the overload condition no longer persists because a sufficient period of time has elapsed allowing the linear SMA actuator 30 to cool to substantially ambient temperature during deactivation, thereby substantially eliminating residual heat retention across the linear SMA actuator 30. In a non-limiting example, the overload close threshold is eight seconds. If however, the overload close counter not greater than the overload close threshold, the scheme proceeds to block 1148 where activation is not allowed. At decision block 1152 the monitored retry counter is compared to a retry threshold. If the retry counter is less than the retry threshold, the scheme 1100 proceeds to decision block 1156. In this scenario the overload protection scheme 1100 may decrease the control signal or control signal threshold (i.e., decision block 1130) during subsequent activation cycles as long as the retry counter is less than the retry threshold, wherein decreasing the control signal or control signal threshold during subsequent activation cycles compensates for increased residual heat retention across the linear SMA actuator 30. The overload close counter correlating to the amount of residual heat retention during the subsequent activation cycle. Likewise, the overload protection scheme 1100 may decrease the initial delay period (i.e., decision block 1128) during subsequent activation cycles when the retry counter is less than the retry threshold, wherein decreasing the initial delay period during subsequent activation cycles compensates for residual heat retention across the linear SMA actuator 30.

Referring back to decision block 1152, if the retry counter is at least the retry threshold, the scheme 1100 proceeds to block 1154 where the linear SMA actuator 30 maintains deactivation in the de-energized state. At decision block 1156, it is determined whether the linear SMA actuator 30 has passed the deactivated (e.g., de-energized) overload reset period. The overload reset period is a period of time sufficiently long enough to allow cooling of the linear SMA actuator 30 to eliminate residual heat retention prior to any subsequent activating of the linear SMA actuator 30. In a non-limiting example, the overload reset period is 64 seconds where deactivation is possibly maintained if the retry counter already reaches the retry threshold. The overload reset period may be tied to the loop counter, correlating to a predefined window. In an alternative embodiment, the counting starts only when an overload is detected. It is further appreciated that the retry threshold is selected to a number of retry activation cycles sufficiently low enough to reduce repetitive detection of an overload condition in a subsequent retry activation cycle that may mechanically overload the linear SMA actuator 30.

Referring to block 1158, after the overload reset period is reached, the overload retry counter is reset to zero and activation may resume at block where the control signal 76 (i.e., PWM duty cycle) is implemented for a subsequent activation cycle at block 1160.

Further, the overload protection control scheme 1100 continuously monitors the position of element 34A of rotatable device 34, the ambient temperature substantially at the linear SMA actuator 30 and output voltage of an electrical storage device for energizing the linear SMA actuator 30. The linear SMA actuator 30 is immediately deactivated and de-energized when any one of the position, ambient temperature and output voltage are outside respective limits for linear SMA actuator 30. When such parameters are outside the limits, a short circuit may be present.

The disclosure has described certain preferred embodiments and modifications thereto. Further modifications and alterations may occur to others upon reading and understanding the specification. Therefore, it is intended that the disclosure not be limited to the particular embodiment(s) disclosed as the best mode contemplated for carrying out this disclosure, but that the disclosure will include all embodiments falling within the scope of the appended claims.

The invention claimed is:

1. Method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, comprising:
    monitoring an overload condition based on position change of the movable element associated with the linear actuator during an integration period and excess energy during the integration period, comprising:
        monitoring position change of the movable element associated with the linear actuator during the integration period comprising monitoring a present feedback signal of the movable element indicating a present position of the movable element, monitoring a command signal of the movable element indicating a preferred position of the movable element, comparing the present feedback signal and the command signal and determining a position change based a difference between the present feedback signal and the command signal;
        comparing the position change to a position change threshold; and
    detecting an overload condition does not exist when the position change is less than the position change threshold;

de-energizing the linear actuator when existence of the overload condition has been detected;
monitoring an overload retry counter based on the number of cycles existence of the overload condition is detected;
comparing the overload retry counter to an overload retry threshold; and
reenergizing the linear actuator when the overload retry counter is less than the overload retry threshold and maintaining de-energizing of the linear actuator when the overload retry counter is at least the overload retry threshold.

2. The method of claim 1 wherein comparing the overload retry counter to the overload retry threshold comprises setting the overload retry threshold to a number of retry cycles sufficiently low enough to reduce repetitively detecting an overload condition in a subsequent retry cycle that may mechanically overload the linear actuator.

3. The method of claim 1 wherein maintaining de-energizing of the linear actuator when the overload retry counter is at least the overload retry threshold comprises de-energizing the linear actuator for a period sufficiently long to allow cooling of the linear actuator to eliminate residual heat retention prior to subsequent energizing cycles.

4. Method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, comprising:
monitoring an overload condition based on position change of the movable element associated with the linear actuator during an integration period and excess energy during the integration period, wherein monitoring the overload condition based on position change of the movable element associated with the linear actuator during an integration period and excess energy during the integration period is subsequent to an initial delay period after the linear actuator is energized, the initial delay period variably adjustable according to elapsed time from a preceding energizing cycle to compensate for residual heat retention from the preceding energizing cycle, voltage variation applied to the linear actuator and ambient temperature variation substantially at the linear actuator, the elapsed period of time correlating to the amount of residual heat retention from the preceding energizing cycle;
de-energizing the linear actuator when an overload condition has been detected;
monitoring an overload retry counter based on the number of cycles the overload condition is detected;
comparing the overload retry counter to an overload retry threshold; and
reenergizing the linear actuator when the overload retry counter is less than the overload retry threshold and maintaining de-energizing of the linear actuator when the overload retry counter is at least the overload retry threshold;
wherein the initial delay period decreases in accordance with a decreased elapsed period of time from the preceding energy cycle, increased ambient temperature substantially at the linear actuator and increased voltage applied to the linear actuator;
wherein the initial delay period increases in accordance with an increased elapsed period of time from the preceding energizing cycle, decreased ambient temperature substantially at the linear actuator and decreased voltage applied to the linear actuator.

5. Method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, comprising:
monitoring an overload condition based on position change of the movable element associated with the linear actuator during an integration period and excess energy during the integration period comprising:
monitoring position change of the movable element associated with the linear actuator during the integration period comprising monitoring a present feedback signal of the movable element, monitoring a command signal of the movable element, comparing the present feedback signal and the command signal and determining position change based on the comparing the present feedback signal and the command signal;
monitoring excess energy during the integration period comprising:
monitoring output voltage of an electrical storage device for energizing the linear actuator;
monitoring a control signal difference between the control signal and a control signal threshold;
integrating the product between the control signal difference and the output voltage; and
determining the excess energy during the integration period based on the integration;
comparing the excess energy during the integration period to an integration threshold;
comparing the position change to a position change threshold; and
detecting an overload condition when the excess energy during the integration period exceeds the integration threshold and the position change during the integration period is less than the position change threshold;
de-energizing the linear actuator when an overload condition has been detected;
monitoring an overload retry counter based on the number of cycles the overload condition is detected;
comparing the overload retry counter to an overload retry threshold; and
reenergizing the linear actuator when the overload retry counter is less than the overload retry threshold and maintaining de-energizing of the linear actuator when the overload retry counter is at least the overload retry threshold.

6. The method of claim 5 wherein detecting the overload condition when the excess energy during the integration period exceeds the integration threshold and the position change during the integration period is less than the position change threshold further comprises not detecting an overload condition and re-monitoring excess energy when one of the excess energy during the integration period does not exceed the integration threshold and the position change during the integration period is at least the position change threshold.

7. The method of claim 6 wherein the position change variably decreases as time increases during periods of energizing the linear actuator.

8. The method of claim 5 wherein monitoring the control signal difference between the control signal and the control signal threshold comprises:
monitoring the command signal indicating a preferred position of the movable element;

monitoring the present feedback signal indicating a present position of the movable element;
comparing the command signal and the present feedback signal;
monitoring the output voltage of the electrical energy storage device for energizing the linear actuator and monitoring ambient temperature substantially at the linear actuator; and
determining the control signal based on the comparing the command signal and the present feedback signal, the output voltage and the ambient temperature.

9. The method of claim 8 wherein the control signal indicates one of pulse width-modulation, current regulation and voltage regulation for controlling energizing current across the linear actuator, and wherein the control signal threshold indicates energizing current across the linear actuator required to move the movable element to the preferred position according to time.

10. The method of claim 5 wherein monitoring position change of the movable element comprises monitoring a present position of the movable element, and wherein monitoring a command signal of the movable element comprises monitoring a preferred position of the movable element.

11. The method of claim 5 wherein the present position corresponds to at least one of a rotary position, rotary angle, linear movement and electric resistance through the linear actuator to obtain the current position.

12. Method for executing mechanical overload protection to prevent commanding a control signal to a linear actuator that may mechanically overload the linear actuator when an overload condition of the linear actuator is detected, the linear actuator utilized for controlling a movable element associated with the linear actuator responsive to the control signal, comprising:
monitoring an overload condition based on position change of the movable element associated with the linear actuator during an integration period and excess energy during the integration period;
de-energizing the linear actuator when an overload condition has been detected;
monitoring an overload retry counter based on the number of cycles the overload condition is detected comprising:
flagging an overload feedback signal indicating a position of the movable element at which the overload condition is detected, the overload retry counter corresponding to the number of cycles having flags indicating the position of the movable element at which the overload condition is detected;
comparing the overload retry counter to an overload retry threshold; and
reenergizing the linear actuator when the overload retry counter is less than the overload retry threshold and maintaining de-energizing of the linear actuator when the overload retry counter is at least the overload retry threshold.

13. Method for executing mechanical overload protection to prevent commanding an activation signal to a linear actuator that may mechanically overload the linear actuator comprising:
activating the linear actuator responsive to the activation signal, the linear actuator configured to move the movable element from an initial position to a preferred position during periods of activation;
monitoring an overload condition based on the activated linear actuator and subsequent to an initial delay period, comprising:
monitoring position change of the movable element associated with the linear actuator during the integration period comprising monitoring a present feedback signal of the movable element indicating a present position of the movable element, monitoring a command signal of the movable element indicating a preferred position of the movable element, comparing the present feedback signal and the command signal and determining a position change based a difference between the present feedback signal and the command signal;
comparing the position change to a position change threshold; and
detecting an overload condition does not exist when the position change is less than the position change threshold;
executing a mechanical overload protection control scheme when an existence of the overload condition has been detected comprising:
deactivating the linear actuator, flagging an overload position indicating a position of the movable element at which the overload condition is detected and monitoring a retry counter corresponding to the number of cycles having flags indicating the overload position of the movable element at which the overload condition was detected;
comparing the retry counter to a retry threshold; and
activating the linear actuator when the retry counter is less than the retry threshold and maintaining deactivation for a period of time sufficiently long to allow cooling of the linear actuator to eliminate residual heat retention prior to any subsequent activating the linear actuator.

14. Method for executing mechanical overload protection to prevent commanding an activation signal to a linear actuator that may mechanically overload the linear actuator comprising:
activating the linear actuator responsive to the activation signal, the linear actuator configured to move the movable element from an initial position to a preferred position during periods of activation;
monitoring an overload condition based on the activated linear actuator and subsequent to an initial delay period, comprising:
monitoring excess energy comprising:
monitoring output voltage of an electrical storage device for energizing the linear actuator;
monitoring a control signal difference between a control signal and a control signal threshold;
integrating the product between the control signal difference and the output voltage; and
determining the excess energy based on the integration;
monitoring an error signal comprising:
monitoring a command signal indicating the preferred position of the movable element;
monitoring the present feedback signal indicating a present position of the movable element;
comparing the command signal and the present feedback signal;
determining the error signal based on the comparing the command signal and the present feedback signal;
comparing the error signal to an error threshold;
comparing the excess energy to an excess energy threshold; and detecting an overload condition when the error signal is at least the error threshold and the excess energy is at least the excess energy threshold and not detecting an overload condition when one of the error signal is less than the error threshold and the excess energy is less than the excess energy threshold;

executing a mechanical overload protection control scheme based on detecting an overload condition comprising:

deactivating the linear actuator, flagging an overload position indicating a position of the movable element at which the overload condition is detected and monitoring a retry counter corresponding to the number of cycles having flags indicating the overload position of the movable element at which the overload condition was detected;

comparing the retry counter to a retry threshold; and activating the linear actuator when the retry counter is less than the retry threshold and maintaining deactivation for a period of time sufficiently long to allow cooling of the linear actuator to eliminate residual heat retention prior to any subsequent activating the linear actuator.

15. The method of claim 14 wherein monitoring the control signal difference between the control signal and the control signal threshold further comprises variably selecting the control signal such that decreasing the control signal compensates for increased residual heat retention across the linear actuator from a preceding activation cycle of the linear actuator.

16. Method for executing mechanical overload protection to prevent commanding an activation signal to a linear actuator that may mechanically overload the linear actuator comprising:

activating the linear actuator responsive to the activation signal, the linear actuator configured to move the movable element from an initial position to a preferred position during periods of activation;

monitoring an overload condition based on the activated linear actuator and subsequent to an initial delay period;

executing a mechanical overload protection control scheme based on detecting an overload condition comprising:

deactivating the linear actuator, flagging an overload position indicating a position of the movable element at which the overload condition is detected and monitoring a retry counter corresponding to the number of cycles having flags indicating the overload position of the movable element at which the overload condition was detected;

comparing the retry counter to a retry threshold, comprising decreasing the initial delay period during subsequent activation cycles when the retry counter is less than the retry threshold, wherein decreasing the initial delay period during subsequent activation cycles compensates for residual heat retention across the linear actuator; and activating the linear actuator when the retry counter is less than the retry threshold and maintaining deactivation for a period of time sufficiently long to allow cooling of the linear actuator to eliminate residual heat retention prior to any subsequent activating the linear actuator.

17. Method for executing mechanical overload protection to prevent commanding an activation signal to a linear actuator that may mechanically overload the linear actuator comprising:

activating the linear actuator responsive to the activation signal, the linear actuator configured to move the movable element from an initial position to a preferred position during periods of activation;

monitoring an overload condition based on the activated linear actuator and subsequent to an initial delay period, comprising:

executing a mechanical overload protection control scheme based on detecting an overload condition comprising:

deactivating the linear actuator, flagging an overload position indicating a position of the movable element at which the overload condition is detected and monitoring a retry counter corresponding to the number of cycles having flags indicating the overload position of the movable element at which the overload condition was detected, comprising:

monitoring an overload close counter;

comparing the overload close counter to an overload close threshold; and decreasing the control signal during subsequent activation cycles when the overload close counter is greater than the overload close threshold and the retry counter is less than the retry threshold, wherein decreasing the control signal during subsequent activation cycles compensates for increased residual heat retention across the linear actuator, the overload close counter correlating to the amount of residual heat retention during the subsequent activation cycle;

comparing the retry counter to a retry threshold; and activating the linear actuator when the retry counter is less than the retry threshold and maintaining deactivation for a period of time sufficiently long to allow cooling of the linear actuator to eliminate residual heat retention prior to any subsequent activating the linear actuator.

18. Method for executing mechanical overload protection to prevent commanding an activation signal to a linear actuator that may mechanically overload the linear actuator comprising:

activating the linear actuator responsive to the activation signal, the linear actuator configured to move the movable element from an initial position to a preferred position during periods of activation;

monitoring an overload condition based on the activated linear actuator and subsequent to an initial delay period, comprising:

executing a mechanical overload protection control scheme based on detecting an overload condition comprising:

deactivating the linear actuator, flagging an overload position indicating a position of the movable element at which the overload condition is detected and monitoring a retry counter corresponding to the number of cycles having flags indicating the overload position of the movable element at which the overload condition was detected, wherein flagging the overload position indicating the position of the movable element at which the overload condition is detected further comprises:

monitoring the number of successive activation cycles having flags corresponding to the overload position;
comparing the number of successive activation cycles having flags corresponding to the overload position to a target threshold; and
resetting the preferred position of the movable element to the overload position when the number of successive activation cycles having flags corresponding to the overload position is at least the target threshold;
comparing the retry counter to a retry threshold, comprising; and
activating the linear actuator when the retry counter is less than the retry threshold and maintaining deactivation for a period of time sufficiently long to allow cooling of the linear actuator to eliminate residual heat retention prior to any subsequent activating the linear actuator.

19. Method for executing mechanical overload protection to prevent commanding an activation signal to a linear actuator that may mechanically overload the linear actuator comprising:
activating the linear actuator responsive to the activation signal, the linear actuator configured to move the movable element from an initial position to a preferred position during periods of activation;
monitoring an overload condition based on the activated linear actuator and subsequent to an initial delay period, comprising:
executing a mechanical overload protection control scheme based on detecting an overload condition comprising:
deactivating the linear actuator, flagging an overload position indicating a position of the movable element at which the overload condition is detected and monitoring a retry counter corresponding to the number of cycles having flags indicating the overload position of the movable element at which the overload condition was detected;
comparing the retry counter to a retry threshold, comprising;
activating the linear actuator when the retry counter is less than the retry threshold and maintaining deactivation for a period of time sufficiently long to allow cooling of the linear actuator to eliminate residual heat retention prior to any subsequent activating the linear actuator; and
continuously monitoring the position of the movable element, the ambient temperature substantially at the linear actuator and output voltage of an electrical storage device for energizing the linear actuator, and immediately deactivating the linear actuator when any one of the position, ambient temperature and output voltage are outside respective limits for activating the linear actuator.

20. Apparatus for executing mechanical overload protection to prevent commanding an activation signal to a linear actuator that may mechanically overload the linear actuator comprising:
a linear actuator coupled to a movable element configured to move the movable element from an initial position to a preferred position during periods of activation;
an activation controller associated with the movable element and the linear actuator:
activating the linear actuator responsive to the activation signal,;
monitoring an overload condition based on the activated linear actuator subsequent to an initial delay period, comprising:
monitoring position change of the movable element associated with the linear actuator during the integration period comprising monitoring a present feedback signal of the movable element indicating a present position of the movable element, monitoring a command signal of the movable element indicating a preferred position of the movable element, comparing the present feedback signal and the command signal and determining a position change based a difference between the present feedback signal and the command signal;
comparing the position change to a position change threshold; and
detecting an overload condition does not exist when the position change is less than the position change threshold; and
executing an electrical overload protection control scheme based on detecting the overload condition comprising:
deactivating the linear actuator, flagging an overload position indicating a position of the movable element at which the overload condition is detected and monitoring a retry counter corresponding to the number of cycles having flags indicating the overload position of the movable element at which the overload condition was detected;
comparing the retry counter to a retry threshold; and
activating the linear actuator when the retry counter is less than the retry threshold and maintaining deactivation for a period of time sufficiently long to allow cooling of the linear actuator to eliminate residual heat retention prior to any subsequent activating the linear actuator.

* * * * *